(12) United States Patent
Oshima

(10) Patent No.: US 8,351,186 B2
(45) Date of Patent: *Jan. 8, 2013

(54) ELECTRODE FOIL FOR CAPACITOR, MANUFACTURING METHOD THEREFOR, AND SOLID ELECTROLYTIC CAPACITOR USING THE ELECTRODE FOIL

(75) Inventor: Akiyoshi Oshima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/062,019

(22) PCT Filed: Sep. 30, 2009

(86) PCT No.: PCT/JP2009/005016
§ 371 (c)(1),
(2), (4) Date: Mar. 3, 2011

(87) PCT Pub. No.: WO2010/041387
PCT Pub. Date: Apr. 15, 2010

(65) Prior Publication Data
US 2011/0182003 A1    Jul. 28, 2011

(30) Foreign Application Priority Data

Oct. 10, 2008 (JP) ................................ 2008-263783

(51) Int. Cl.
*H01G 9/145* (2006.01)
*H01G 9/04* (2006.01)
(52) U.S. Cl. ................. 361/532; 29/25.03; 361/516
(58) Field of Classification Search .......... 361/529–530, 361/508–509, 511; 29/25.03
See application file for complete search history.

(56) References Cited

U.S. PATENT DOCUMENTS

| 4,970,626 | A  | 11/1990 | Kakinoki et al. |
| 5,431,971 | A  | 7/1995  | Allegret et al. |
| 6,226,173 | B1 | 5/2001  | Welsch et al. |
| 6,456,483 | B1 | 9/2002  | Chiavarotti et al. |
| 6,495,021 | B2 | 12/2002 | Welsch et al. |
| 6,914,769 | B2 | 7/2005  | Welsch et al. |

(Continued)

FOREIGN PATENT DOCUMENTS

JP    02-216812 A    8/1990

(Continued)

OTHER PUBLICATIONS

International Search Report for International Application No. PCT/JP2009/005016, Dec. 22, 2009, Panasonic Corporation.

(Continued)

*Primary Examiner* — Eric Thomas
(74) *Attorney, Agent, or Firm* — RatnerPrestia

(57) ABSTRACT

An electrode foil for capacitor includes a substrate made of a valve metal foil, a first rough surface layer made of a valve metal formed on the first surface of the substrate by vapor deposition, and a second rough surface layer made of a valve metal formed on the second surface of the substrate by vapor deposition. The mode of diameters of pores of the first and second rough surface layers ranges from 0.02 μm to 0.10 μm. The thickness of the first rough surface layer is larger than the thickness of the second rough surface layer. The electrode foil has the rough surface layers formed by vapor deposition fabricated stably so that a solid electrolytic capacitor with high capacitance can be obtained using the foil.

10 Claims, 10 Drawing Sheets

U.S. PATENT DOCUMENTS

| | | |
|---|---|---|
| 6,933,041 B2 | 8/2005 | Katsir et al. |
| 2010/0021719 A1 | 1/2010 | Makino et al. |
| 2010/0202102 A1* | 8/2010 | Aoyama et al. ............... 361/525 |

FOREIGN PATENT DOCUMENTS

| | | |
|---|---|---|
| JP | 03-263312 | 11/1991 |
| JP | 05-190399 A | 7/1993 |
| JP | 2003-045753 A | 2/2003 |
| JP | 2008-010490 | 1/2008 |
| JP | 2008-047755 A | 2/2008 |
| WO | WO 89/01230 | 2/1989 |
| WO | WO 2007/116845 A1 | 10/2007 |
| WO | WO 2009060563 A1 * | 5/2009 |

OTHER PUBLICATIONS

Chinese Office Action for Appl. No. 200980135716.X, Apr. 6, 2012.

* cited by examiner

ELECTRODE FOIL FOR CAPACITOR, MANUFACTURING METHOD THEREFOR, AND SOLID ELECTROLYTIC CAPACITOR USING THE ELECTRODE FOIL

This application is a U.S. National Phase Application of PCT International Application PCT/JP2006/005016.

TECHNICAL FIELD

The present invention relates to an electrode foil for capacitor used in a solid electrolytic capacitor that uses a conductive polymer as a solid electrolyte, and a method for manufacturing the electrode foil.

BACKGROUND ART

As electronic devices have been moving to higher-frequency operation, capacitors used in such devices as an electronic component, have been required to have excellent impedance characteristics at higher frequencies than before. In order to meet this requirement, various solid electrolytic capacitors with solid electrolytes made of conductive polymers with high electric conductivity have been suggested.

In recent years, solid electrolytic capacitors used in devices including CPU peripheries of personal computers are strongly desired to have smaller sizes and higher capacitances. In addition, such capacitors are required to have lower equivalent series resistance (ESR) for adaptation of high frequency, and to have lower equivalent series inductance (ESL) that is advantageous to denoising and transient response performance.

FIG. 15 is a perspective view of conventional solid electrolytic capacitor 501 described in Patent Literature 1. FIG. 16 is a plan view of capacitor element 21 of solid electrolytic capacitor 501. Capacitor element 21 includes: an electrode foil which serves as an anode body made of an aluminum foil, i.e., a valve metal; and a dielectric oxide film disposed on the surface of the electrode foil. The surface of the electrode foil is roughened. The electrode foil is separated into anode electrode portion 23 and a cathode forming area by insulating resist layer 22 disposed on the dielectric oxide film. Capacitor element 21 further includes: a solid electrolyte layer made of a conductive polymer disposed on the dielectric oxide film in the cathode forming area of the electrode foil; and a cathode layer disposed on the solid electrolyte layer. The cathode layer is composed of a carbon layer disposed on the solid electrolyte layer and a silver paste layer disposed on the carbon layer. The solid electrolyte layer and the cathode layer constitute cathode electrode portion 24. The electrode foil has a rectangular shape extending in a longitudinal direction. Capacitor element 21 has a planar shape. Anode electrode portion 23 and cathode electrode portion 24 are arranged in the longitudinal direction with resist layer 22 interposed between anode electrode portion 23 and cathode electrode portion 24.

Anode common terminal 25 is coupled with anode electrode portion 23 of capacitor element 21. A plurality of capacitor elements 21 are stacked one on another on anode common terminal 25, and anode electrode portions 23 of the plurality of capacitor elements 21 are joined together by a joining method, such as laser welding.

Cathode common terminal 26 is coupled with cathode electrode portion 24 of capacitor element 21. Bent portion 26A is formed by bending upward both sides of an element-mounting portion of cathode common terminal 26. The element-mounting portion of cathode common terminal 26 is joined with cathode electrode portions 24 of the plurality of capacitor elements 21 to electrically connect therebetween with a conductive adhesive. Cathode electrode portions 24 of the plurality of capacitor elements 21 are joined with one another to be electrically connected with the conductive adhesive. Bent portion 26A is joined with cathode electrode portion 24 to be electrically connected with conductive adhesive 27.

Insulating package resin 28 covers the plurality of capacitor elements 21 integrally with both a portion of anode common terminal 25 and a portion of cathode common terminal 26 being exposed to the outside surface. The portions of anode common terminal 25 and cathode common terminal 26 exposed from package resin 28 are bent along package resin 28 to a bottom of package resin 28, thus constituting surface-mounted solid electrolytic capacitor 501 with both an anode terminal portion and a cathode terminal portion formed on the bottom surface thereof.

In conventional solid electrolytic capacitor 501, the surface of the electrode foil made of the aluminum foil of capacitor element 21 is roughened by etching in order to increase the surface area per unit area thereof to increase the capacitance. Since the etching technology and mechanical strength of aluminum foils limits a further increase in the surface area, it appears to be difficult to obtain higher capacitance beyond the limitation.

CITATION LIST

Patent Literature
Patent Literature 1: Japanese Patent Unexamined Publication No. 2003-45753

SUMMARY OF THE INVENTION

An electrode foil for capacitor includes a substrate made of a valve metal foil, a first rough surface layer made of a valve metal formed on the first surface of the substrate by vapor deposition, and a second rough surface layer made of a valve metal formed on the second surface of the substrate by vapor deposition. The mode of diameters of pores of the first and second rough surface layers ranges from 0.02 μm to 0.10 μm. The thickness of the first rough surface layer is larger than the thickness of the second rough surface layer.

The electrode foil has the rough surface layers formed by vapor deposition fabricated stably so that a solid electrolytic capacitor with high capacitance can be obtained using the foil.

DETAILED DESCRIPTION OF PREFERRED EMBODIMENT

Figure 1:
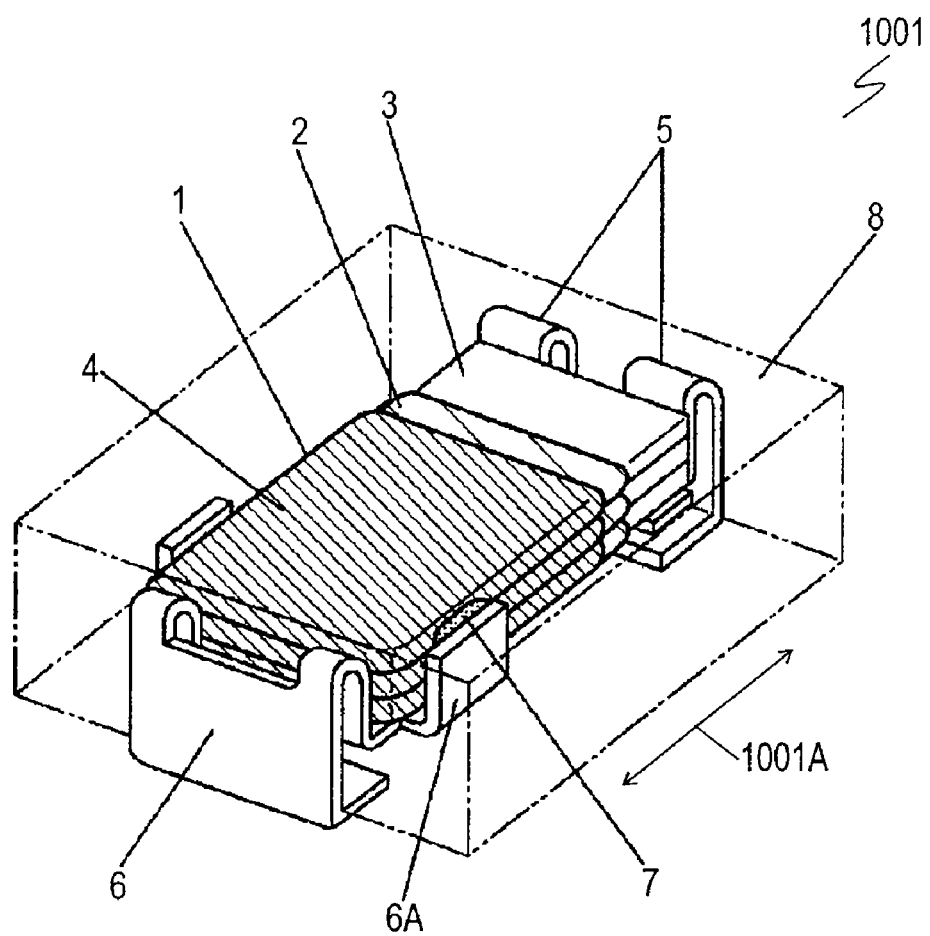
FIG. 1 is a perspective view of a solid electrolytic capacitor of an exemplary embodiment according to the present invention.

FIG. 1 is a perspective view of solid electrolytic capacitor 1001 according to an exemplary embodiment of the present invention. Solid electrolytic capacitor 1001 includes a plurality of capacitor elements 1 that are stacked one on another.

Figure 2A:
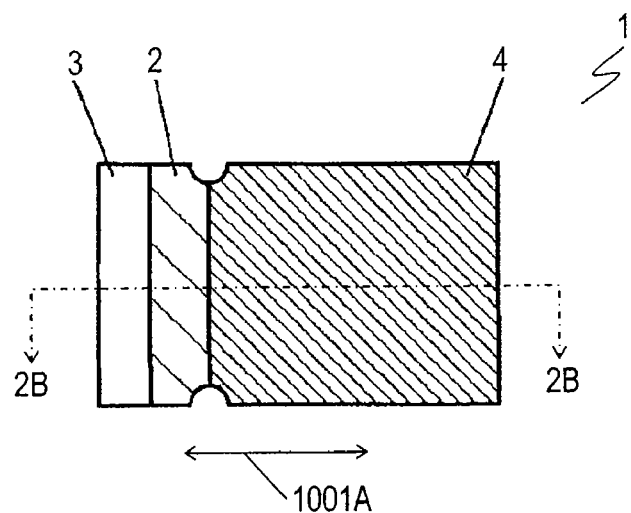
FIG. 2A is a plan view of a capacitor element of the solid electrolytic capacitor of the embodiment.
Figure 2B:
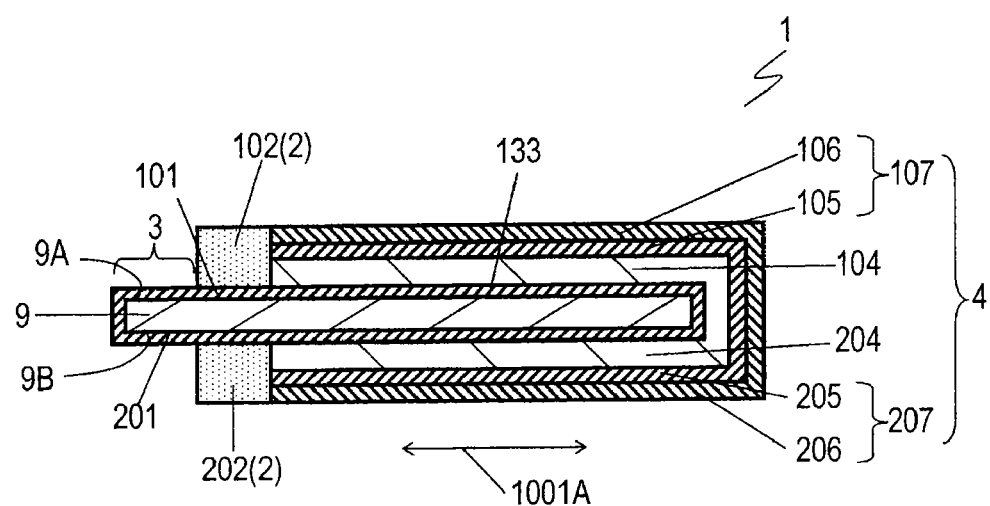
FIG. 2B is a cross sectional view of the capacitor element along line 2B-2B shown in FIG. 2A.

FIG. 2A is a plan view of capacitor element 1 of solid electrolytic capacitor 1001. FIG. 2B is a cross sectional view of capacitor element 1 along line 2B-2B shown in FIG. 2A. Electrode foil 9 which serves as an anode body made of a valve metal, such as aluminum, has substantially a rectangular shape extending in longitudinal direction 1001A, and has upper surface 9A and lower surface 9B opposite to each other. Dielectric oxide films 101 and 201 are disposed on upper surfaces 9A and lower surface 9B of electrode foil 9, respectively. Insulating upper resist portion 102 is disposed on the upper surface of dielectric oxide film 101. Upper resist portion 102 separates the upper surface of dielectric oxide film 101 into anode electrode portion 103 and cathode forming area 133 along longitudinal direction 1001A. On cathode forming area 133, solid electrolyte layer 104 made of a conductive polymer is disposed. On the upper surface of solid electrolyte layer 104, carbon layer 105 is disposed. On the upper surface of carbon layer 105, upper silver paste layer 106 is formed. Both carbon layer 105 and silver paste layer 106 constitute cathode layer 107 disposed on the upper surface of solid electrolyte layer 104. On the lower surface of dielectric oxide film 201, insulating lower resist portion 202 is disposed. Lower resist portion 202 separates the lower surface of dielectric oxide film 201 into anode electrode portion 203 and cathode forming area 233 along longitudinal direction 1001A. Cathode forming area 233 is provided with solid electrolyte layer 204 made of a conductive polymer. On the lower surface of solid electrolyte layer 204, carbon layer 205 is disposed. On the lower surface of carbon layer 205, silver paste layer 206 is formed. Both carbon layer 205 and silver paste layer 206 constitute cathode layer 207 disposed on the lower surface of solid electrolyte layer 204. Solid electrolyte layers 104 and 204 and cathode layers 107 and 207 constitute cathode electrode portion 4. Both anode electrode portion 103 and anode electrode portion 203 constitute anode electrode portion 3. Both upper resist portion 102 and lower resist portion 203 constitute resist layer 2. Capacitor element 1 has a planar shape, and anode electrode portion 3 and cathode electrode portion 4 are arranged along longitudinal direction 1001A with resist layer 2 interposed between anode electrode portion 3 and cathode electrode portion 4. Anode electrode portion 3 and cathode electrode portion 4 are disposed at ends 1A and 1B opposite to each other along longitudinal direction 1001A of capacitor element 1, respectively.

The plurality of capacitor elements 1 are stacked one on another on anode common terminal 5, and anode electrode portions 3 are joined together by a joining method, such as laser welding. Specifically, portions of dielectric oxide films 101 and 201 of anode electrode portions 3 are broken by welding, which in turn allows electrode foils 9 to be joined to anode common terminal 5, resulting in electrical connections therebetween.

The plurality of capacitor elements 1 being stacked are mounted on an element-mounting portion of cathode common terminal 6. The plurality of capacitor elements 1 are joined with cathode electrode portions 4 to be electrically connected therebetween with a conductive adhesive, and cathode electrode portions 4 of the plurality of capacitor elements 1 are joined with one another to be electrically connected therebetween with a conductive adhesive. Cathode common terminal 6 includes bent portion 6A that is formed by bending up both sides of the element-mounting portion. Bent portion 6A is joined to cathode electrode portions 4 with conductive adhesive 7 to be electrically connected therebetween.

Insulating package resin 8 covers the plurality of capacitor elements 1, anode common terminal 5, and cathode common terminal 6 integrally with portions of anode common terminal 5 and cathode common terminal 6 being exposed to an outside surface. The portions of anode common terminal 5 and cathode common terminal 6 that are exposed from package resin 8 are bent along package resin 8 to a bottom surface of the package resin, and extend along package resin 8. Anode common terminal 5 and cathode common terminal 6 constitute an anode terminal portion and a cathode terminal portion at the bottom surface of package resin 8, respectively, thereby constituting surface-mounted solid electrolytic capacitor 1001.

Figure 3:
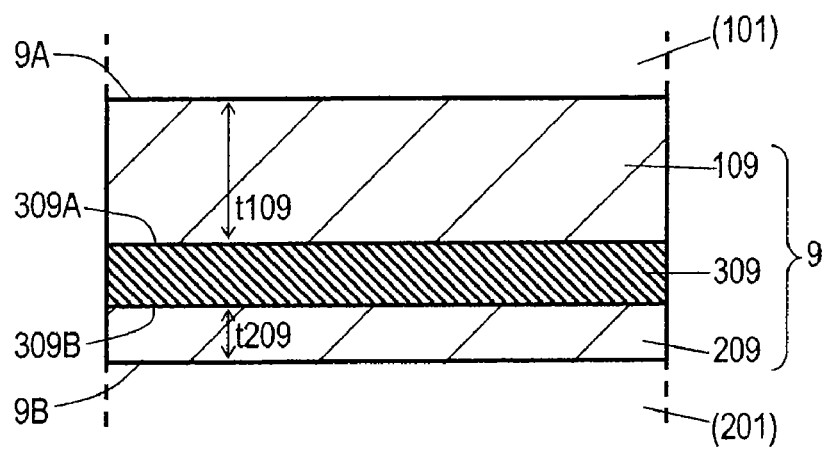
FIG. 3 is a cross sectional view of an electrode foil of the capacitor element of the embodiment.

FIG. 3 is a cross sectional view of electrode foil 9 of capacitor element 1. Electrode foil 9 includes: substrate 309 made of an aluminum foil; rough surface layer 109 that is formed on upper surface 309A of substrate 309 by vapor deposition; and rough surface layer 209 that is formed on lower surface 309B of substrate 309 by vapor deposition. On the upper surface of rough surface layer 109, i.e., upper surface 9A of electrode foil 9, dielectric oxide film 101 is disposed. On the lower surface of rough surface layer 209, i.e., lower surface 9B of electrode foil 9, dielectric oxide film 201 is disposed. Both surfaces of 309A and 309B of substrate 309 themselves are devoid of any rough surface layer, which means that surfaces of 309A and 309B themselves do not substantially have any pores therein. Thickness t109 of rough surface layer 109 is different from thickness t209 of rough surface layer 209.

Figure 4:
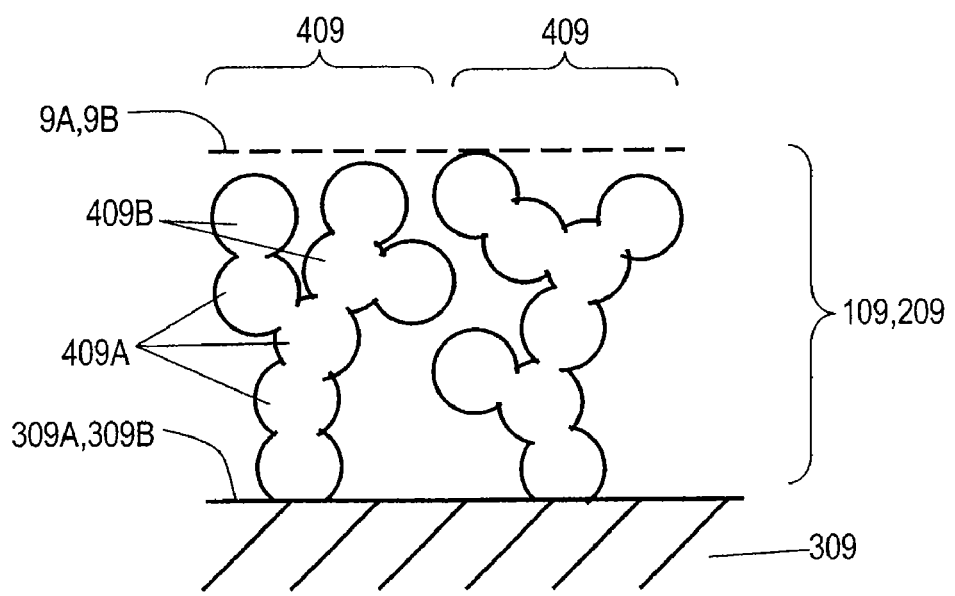
FIG. 4 is a schematic view of a rough surface layer of the electrode foil of the embodiment.
Figure 5A:
FIG. 5A is an enlarged view of the electrode foil shown in FIG. 3.
Figure 5B:
FIG. 5B is an enlarged view of the electrode foil shown in FIG. 5A.

FIG. 4 is a schematic sectional view of rough surface layers 109 and 209. FIGS. 5A and 5B are enlarged views of rough surface layers 109 and 209, i.e., show photographs taken with a scanning electron microscope (SEM) at magnifications of 10,000 and 30,000, respectively. As shown in FIGS. 4, 5A, and 5B, each of rough surface layers 109 and 209 includes a plurality of tree structures 409 that extend from each of upper and lower surfaces 309A and 309B of substrate 309 to upper and lower surfaces 9A and 9B, respectively. Each of tree structures 409 includes a plurality of fine particles 409A made of a valve metal, such as aluminum, linked together. Tree structures 409 of rough surface layer 109 (209) extend from upper surface 309A (lower surface 309B) of substrate 309 to upper surface 9A (lower surface 9B) with each structure branching into a plurality of twigs 409B.

Hereinafter, a manufacturing method for electrode foil 9 will be described. Substrate 309 made of a valve metal foil is disposed inside a deposition chamber held at a vacuum pressure ranging from 0.01 Pa to 0.001 Pa. Then, an atmospheric gas, i.e., a mixture of one part by volume of an active gas of oxygen and two to six parts by volume of an inert gas of argon, is introduced around substrate 309 such that the pressure around substrate 309 ranges from 10 Pa to 30 Pa, and the temperature of substrate 309 ranges from 150° C. to 300° C. Under the conditions, an aluminum material is placed as a vapor source inside the deposition chamber, and then deposited onto surfaces 309A and 309B of substrate 309 to form rough surface layers 109 and 209 composed of fine particles 409A made of aluminum.

In the embodiment, substrate 309 is a high-purity aluminum foil with a thickness of 50 μm. The vacuum pressure prior to the introduction of the atmospheric gas is adjusted to 0.004 Pa. The atmospheric gas is composed of one part by volume of oxygen gas and four parts by volume of argon gas. The flow rate of the atmospheric gas is adjusted such that the pressure around substrate 309 is 20 Pa after the atmospheric gas is introduced. The temperature of substrate 309 is set to be 200° C.

Figure 6:
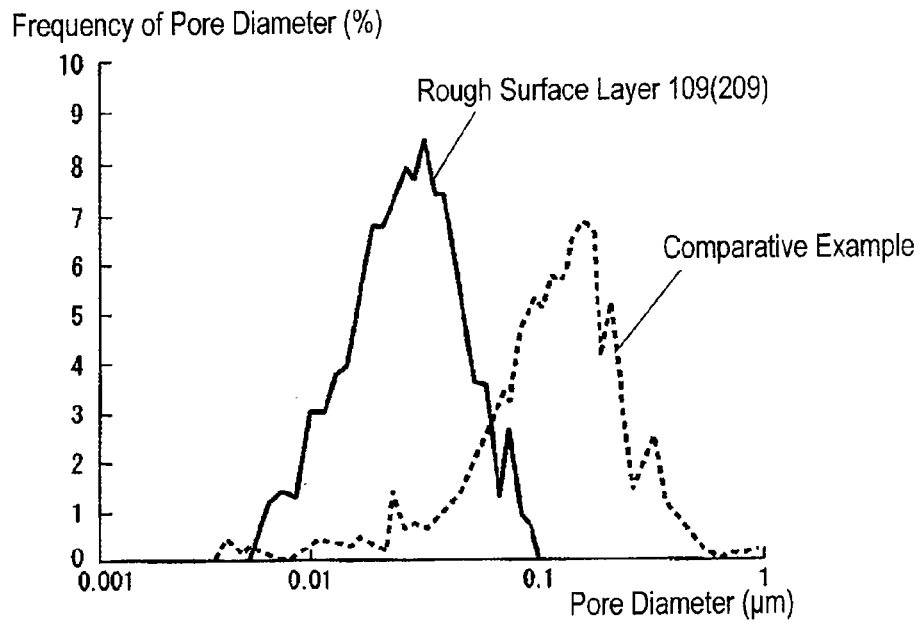
FIG. 6 illustrates a distribution of pore diameters of the rough surface layer of the electrode foil of the embodiment.

FIG. 6 shows a distribution of pore diameters of rough surface layers 109 and 209 fabricated by the method mentioned above. FIG. 6 also shows a distribution of pore diameters of a rough surface layer of a comparative example formed by etching a substrate made of an aluminum foil. In FIG. 6, the abscissa axis indicates the pore diameters, and the ordinate axis indicates the frequency of the pore diameters. The mode of the pore diameters of rough surface layers 109 and 209 according to the embodiment is very small and about 0.03 μm, exhibiting much finer pore diameters in comparison with the mode of 0.15 μm of the pore diameters of the rough surface layer of the comparative example. Electrode foil 9 has a very large surface area due to rough surface layers 109 and 209. Moreover, rough surface layers 109 and 209 are constructed of a plurality of tree structures 409, thereby allowing a larger amount of liquid, such as a polymer solution, to be impregnated therein.

In addition, in the plurality of tree structures 409 of rough surface layers 109 and 209, fine particles 409A are each strongly bonded to one another, and can prevent possible destruction of necking portions through which tree structures 409 are bonded to substrate 309. This prevents possible destruction of the necking portions during anodization for fabricating dielectric oxide films 101 and 201, and hence, not only increases strength of electrode foil 9 but also prevents degradation of capacitance of finished capacitors.

Next, details of characteristics of electrode foil 9 will be described hereinafter.

Electrode foils 9 having rough surface layers 109 and 209 that exhibit various modes of pore diameters were fabricated. Besides, electrode foils of a comparative example having rough surface layers formed by etching were fabricated. These electrode foils were dipped in an aqueous solution containing 7% of ammonium adipate at 70° C. and anodized at an anodizing voltage of 5 V and an anodizing current of 0.05 A/cm$^2$ for 20 minutes of holding time, thereby performing a formation of dielectric oxide films 109 and 209 on both sides 9A and 9B of electrode foils 9, respectively. Strips of samples with areas of 10 cm$^2$ cut out from electrode foils 9 on which dielectric oxide films 109 and 209 had been formed were immersed in an aqueous solution containing 8% of ammonium borate at 30° C., and were measured in a capacitance as an anodization capacitance at a measurement frequency of 120 Hz with an impedance analyzer.

Figure 7:
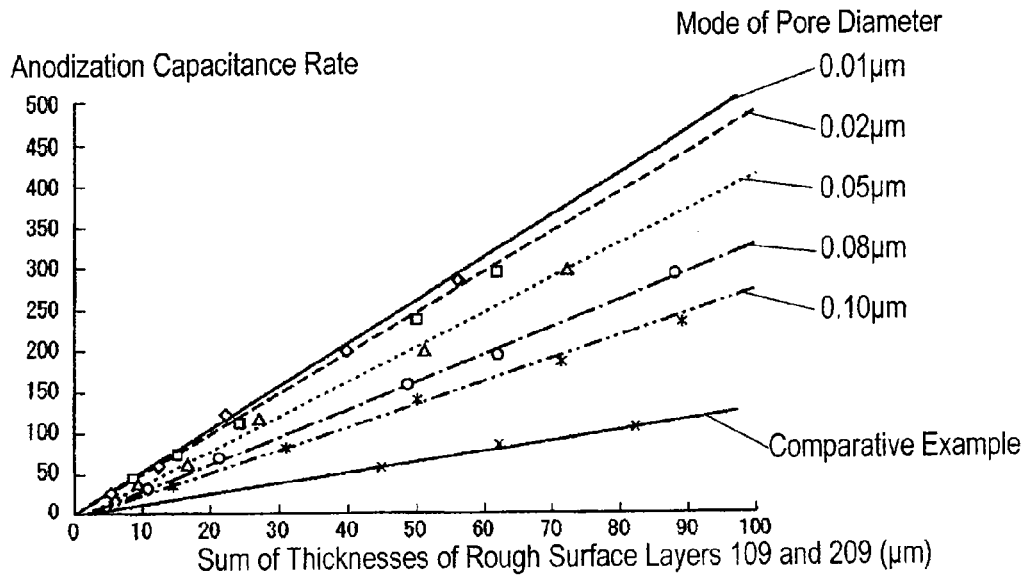
FIG. 7 illustrates relationships between thicknesses of the rough surface layers and anodization capacitance rates of the embodiment.

FIG. 7 illustrates relationships of the anodization capacitance rate and the sums of thickness t109 of rough surface layer 109 and thickness t209 of rough surface layer 209 of electrode foils 9. In FIG. 7, the anodization capacitance rate of the electrode foils is defined as the ratio in unit of percent of the anodization capacitance to the anodization capacitance of the comparative example of electrode foil that has the total thickness of 80 μm of the surface-roughened layers on the both sides thereof.

As shown in FIG. 7, as the mode of pore diameters decreases, the anodization capacitance rate increases in proportion to the thicknesses of the roughened-surface layers. Electrode foils 9 of the embodiment exhibit higher anodization capacitance than that of the comparative electrode foil at the same thickness. This result is attributed to the fact that the pore diameters of electrode foils 9 are smaller than those of the comparative electrode foil, resulting in the larger ratios of the surface areas to the sizes of electrode foils 9 than that of the comparative foil. Accordingly, electrode foil 9 of the embodiment provides solid electrolyte capacitors with a smaller thickness and higher capacitance than the comparative example of electrode foil does.

Next, the dielectric oxide films of both of electrode foils 9 of the embodiment and the comparative example of the electrode foils were subjected to an electrolytic polymerization with a pyrrol monomer to form the solid electrolyte layers. Then, carbon and silver paste were applied to the solid electrolyte layers to form cathode layers thereon. Then, each of these foils was measured in a capacitance, as a product capacitance, at a measurement frequency of 120 Hz with an impedance analyzer. Then, an electrode-covering rate, i.e., the ratio of product capacitance to the anodization capacitance, was determined.

Figure 8:
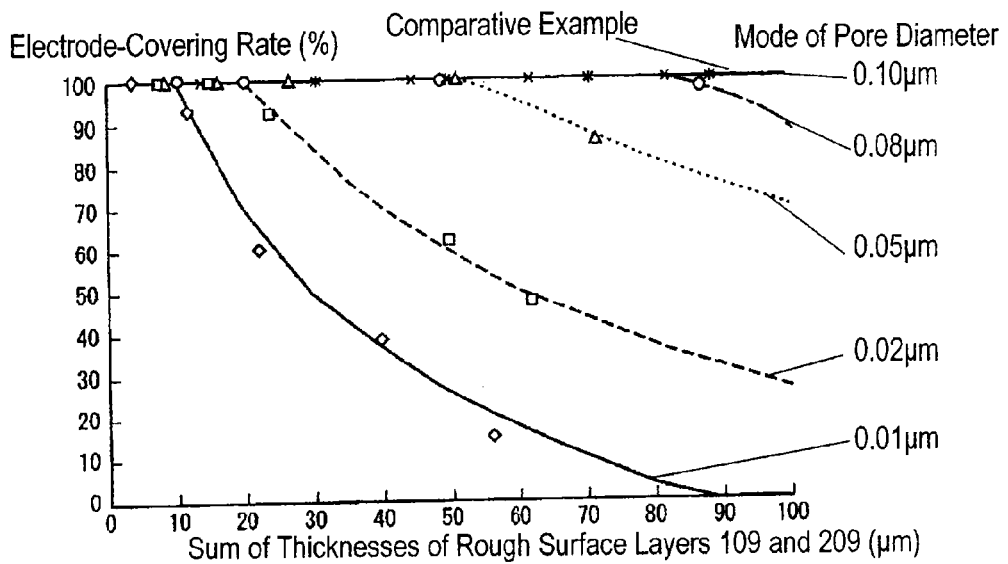
FIG. 8 illustrates relationships between the thicknesses of the rough surface layers and electrode-covering rates of the embodiment.

FIG. 8 illustrates relationships between the sums of the thicknesses of rough surface layers 109 and 209 of electrode foils 9 and the electrode-covering rates. As shown in FIG. 8, as the mode of pore diameters decreases, the electrode-covering rates further decrease in proportion to the thickness of the rough surface layer. This result is attributed to the fact that a decrease in the modes of pore diameters prevents the solution of monomer from impregnating therein, and the increase in the thicknesses of the rough surface layers prevents the solution of monomer from impregnating. Accordingly, in order to avoid the decrease of the electrode-covering rate, it is necessary to increase the mode of pore diameters when the thicknesses of the rough surface layers are increased. If the thicknesses of the rough surface layers are decreased, the mode of pore diameters may be reduced without a decrease in the electrode-covering rate.

Figure 9:
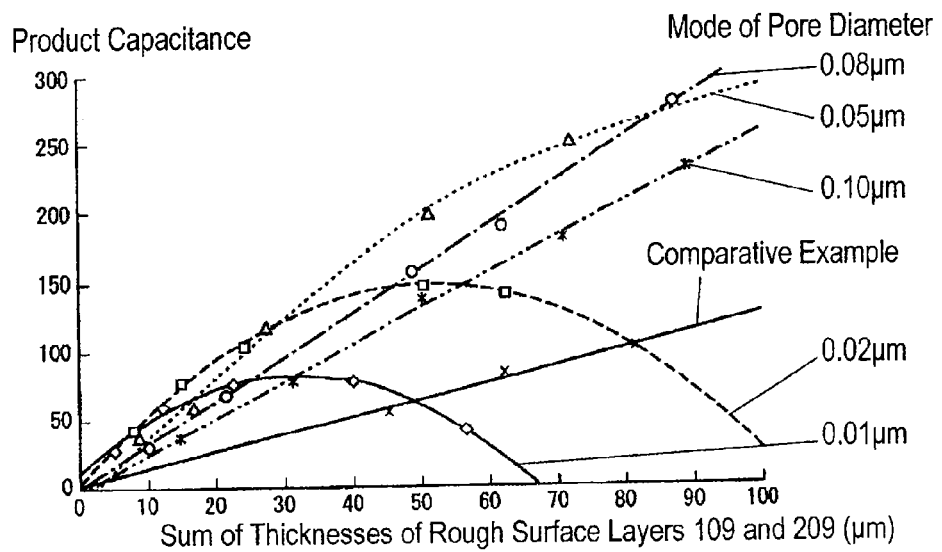
FIG. 9 illustrates relationships between the thicknesses of the rough surface layers and product capacitance rates of the embodiment.

FIG. 9 shows relationships between the thicknesses of the rough surface layers and the product capacitance at various modes of pore diameters. These relationships are determined from: relationships between the thicknesses of the rough surface layers and the anodization capacitance rate shown in FIG. 7; and relationships between the thicknesses of the rough surface layers and the electrode-covering rates shown in FIG. 8, both at various modes of pore diameters. As shown in FIG. 7, electrode foil 9 with a mode of pore diameters of 0.01 μm has the largest anodization capacitance rate. However, as shown in FIG. 8, since electrode foil 9 with a mode of pore diameters of 0.01 μm has a small electrode-covering rate, the product capacitance of such foil cannot exceed that of the comparative electrode foil with the rough surface layers of the total thickness of 80 μm.

Electrode foil 9 of a mode of pore diameters of 0.02 μm has the product capacitance exceeding that of the comparative electrode foil with the rough surface layers of the total thickness of 80 μm, in the range from 20 μm to 80 μm of the total thickness of rough surface layers 109 and 209 of electrode foil 9. However, even electrode foil 9 of a mode of pore diameters of more than 0.02 μm may have the product capacitance of such foil not exceeding that of the comparative electrode foil with the rough surface layers of the total thickness of 80 μm, within the range of smaller thicknesses of the rough surface layers of electrode foil 9.

Note that, even if the product capacitance does not exceed that of the comparative electrode foil with the rough surface layers of the total thickness of 80 μm, since the capacitance per thickness of rough surface layer largely exceeds that of the comparative electrode foil, electrode foil 9 of the embodiment is capable of providing almost the same capacitance with even thinner rough surface layers. Moreover, since the electrode-covering rate increases as the increasing of the mode of pore diameters, the solid electrolytic capacitor is highly reliable as a finished product.

That is, in the comparative electrode foil with rough surface layers formed by etching of the total thickness of 80 μm, the substrate is required to have a thickness of 25 μm to ensure mechanical strength thereof, which in turn results in the thickness of 105 μm of the electrode foil 9. In the embodiment, as shown in FIG. 9, in the case that the mode of pore diameters is 0.02 μm, it is possible to obtain capacitance substantially equal to that of the comparative electrode foil if the sum of the thicknesses t109 and t209 of rough surface layers 109 and 209 is 20 μm. Therefore, the thickness of electrode foil 9 of 45 μm (=20 μm+25 μm) is enough to ensure mechanical strength thereof, which is smaller than that of the comparative electrode foil. Now that, since an increase in the thickness of the substrate 309 leads to a smaller equivalent series resistance (ESR) of solid electrolyte capacitor 1001, the thickness of electrode foil 9 can be determined by taking an optimal balance between capacitance and ESR, allowing a larger design margin.

Thus, the product capacitance of electrode foil 9 of the embodiment greatly exceeds that of the comparative electrode foil with the rough surface layers formed by etching of the total thickness of 80 μm when the mode of pore diameters ranges from 0.02 μm to 0.10 μm and the total thickness of rough surface layers 109 and 209 ranges from 20 μm to 80 μm. This allows electrode foil 9 to be thinner, accordingly allowing solid electrolyte capacitor 1001 to have a smaller size and a higher capacitance.

Note that, in the embodiment, when the modes of pore diameters are from 0.05 μm to 0.10 μm, the electrode-covering rates of rough surface layers 109 and 209 increase. Therefore, even in cases where the sum of thicknesses of rough surface layers 109 and 209 exceeds 80 μm, the product capacitance rates thereof can exceed the product capacitance rate of 100 of the comparative electrode foil having the thickness formed by etching of 80 μm. This allows the capacitor of the embodiment to have a larger capacitance than the comparative example.

Figure 10:
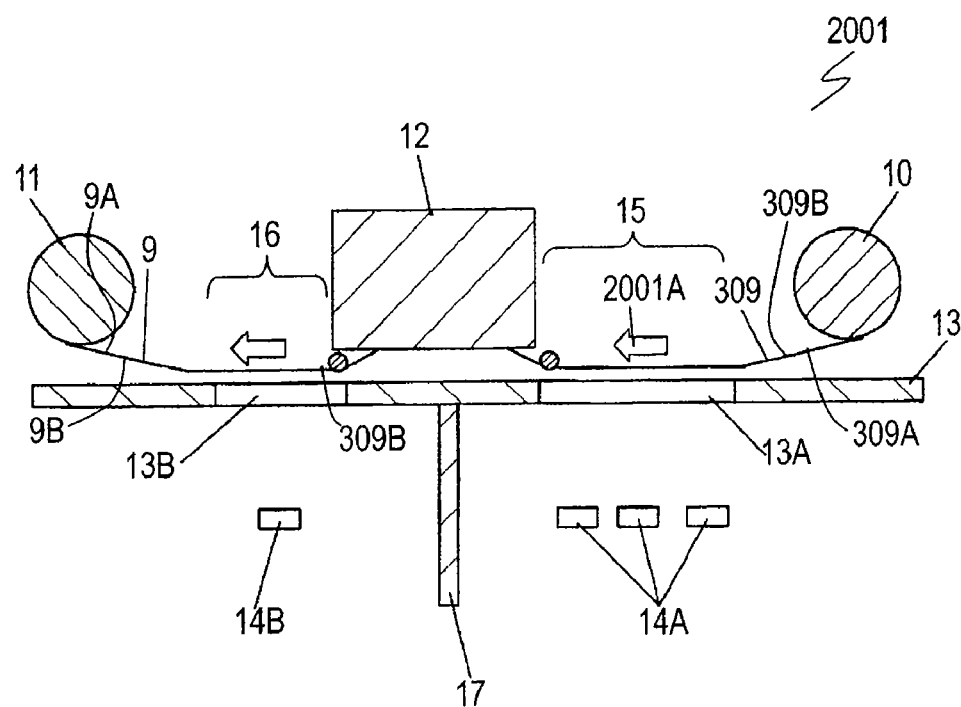
FIG. 10 is a conceptual diagram of a manufacturing apparatus for manufacturing the electrode foil for capacitor of the embodiment.

FIG. 10 is a conceptual diagram of manufacturing apparatus 2001 for manufacturing electrode foil 9 for capacitor of the embodiment. Supplying unit 10 accommodates substrate 309 made of a rolled aluminum foil, and feeds substrate 309. Accepting unit 11 receives and winds electrode foil 9 which includes substrate 309 and rough surface layers 109 and 209 that are formed on surfaces 309A and 309B of substrate 309, respectively. Substrate 309 is transferred at a predetermined speed via transferring path 2001A that is disposed from supplying unit 10 to accepting unit 11. In the embodiment, the thickness of substrate 309 is 82 μm.

Reversing unit 12 that is disposed in the middle of transferring path 2001A from supplying unit 10 to accepting unit 11 reverses substrate 309 by 180 degrees, alternating upper surface 309A and lower surface 309B thereof.

Shielding plate 13 placed along transferring path 2001A is disposed below substrate 309. Shielding plate 13 is provided with openings 13A and 13B therein. Opening 13A is located at the upstream of reversing unit 12, i.e., between reversing unit 12 and supplying unit 10. Opening 13B is located at the downstream of reversing unit 12, i.e., between reversing unit 12 and accepting unit 11. Below opening 13A, a plurality of evaporation ports 14A for heating aluminum to evaporate are disposed. Below opening 13B, at least one evaporation port 14B for heating aluminum to evaporate is disposed. Opening 13A and evaporation ports 14A constitute primary vapor-deposition section 15, and opening 13B and evaporation port 14B constitute secondary vapor-deposition section 16.

The area of opening 13A of shielding plate 13 in primary vapor-deposition section 15 is larger than that of opening 13B of shielding plate 13 in secondary vapor-deposition section 16. The number of the plurality of evaporation ports 14A in primary vapor-deposition section 15 is larger than that of the at least one evaporation port 14B in secondary vapor-deposition section 16.

Partition plate 17 separates evaporation ports 14A in primary vapor-deposition section 15 from evaporation port 14B in secondary vapor-deposition section 16. This configuration can prevent vapor-deposition processes in primary and secondary vapor-deposition sections 15 and 16 from influencing each other.

An operation of manufacturing apparatus 2001 for manufacturing electrode foil 9 for capacitor of the embodiment will be described below. Supplying unit 10 feeds substrate 309 such that surface 309A thereof faces downward, i.e., faces opening 13A and evaporation ports 14A. In primary vapor-deposition section 15, aluminum is deposited onto surface 309A of substrate 309 to form rough surface layer 109 thereon. Then, reversing unit 12 turns substrate 309 upside down and transfers substrate 309 such that face 309B thereof faces downward, i.e., faces opening 13B and evaporation port 14B. Next, in secondary vapor-deposition section 16, aluminum is deposited onto surface 309B of substrate 309 to form rough surface layer 209 thereon, resulting in electrode foil 9 for capacitor. Then, resulting electrode foil 9 for capacitor is wound with accepting unit 11.

In the method where surface-roughed layers are sequentially formed on both sides of a substrate, the previously-formed rough surface layer tends to suffer damage caused by radiation heat during the forming of the subsequently-formed rough surface layer. This may cause an increase in the diameters of fine particles of the previously-formed rough surface layer, leading to a decreasing in capacitance of solid electrolytic capacitors.

Figure 11:
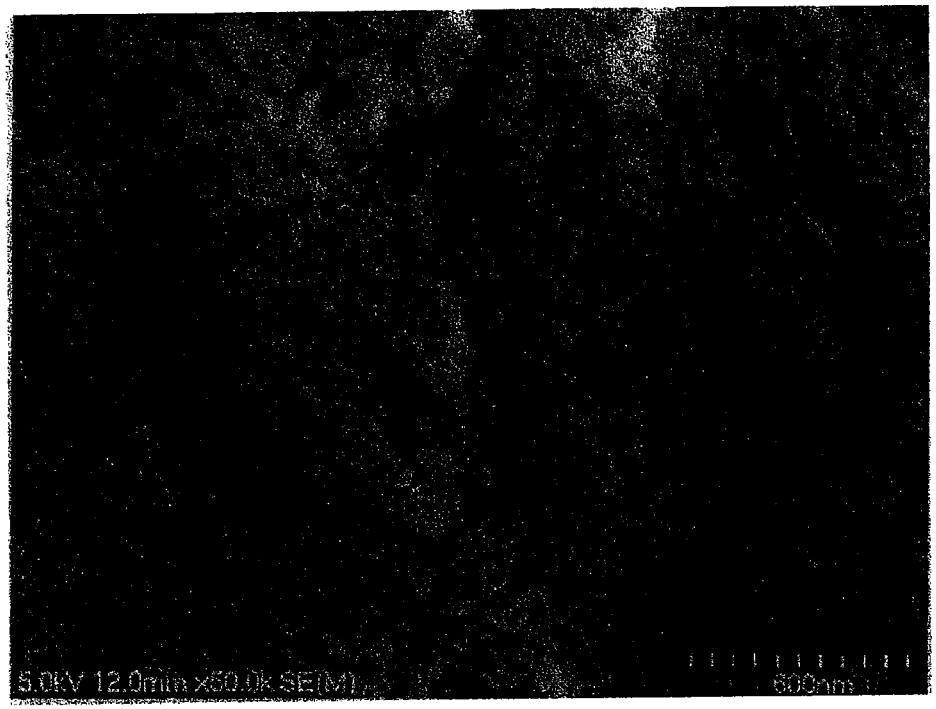
FIG. 11 is an enlarged view of the rough surface layer of the electrode foil of the embodiment.
Figure 12:
FIG. 12 is an enlarged view of the rough surface layer of the embodiment.

FIGS. 11 and 12 show photographs of the rough surface layers of electrode foils subjected to radiation heat at 200° C. and 300° C., respectively, taken with a SEM at the same magnification. The rough surface layer shown in FIG. 12 exhibits larger diameters of fine particles than those of the rough surface layer shown in FIG. 11. The capacitance of a solid electrolytic capacitor including the electrode foil heated at a temperature of 300° C. was 80% of that of a solid electrolytic capacitor including the electrode foil heated at a temperature of 200° C. Since a temperature caused actually by radiation heat exceeds 300° C., the diameters of fine particles become even larger, leading to further less capacitance of capacitors.

As shown in FIG. 3, thickness t109 of rough surface layer 109 formed on surface 309A of substrate 309 is different from thickness t209 of rough surface layer 209 formed on surface 309B. The area of opening 13A of shielding plate 13 in primary vapor-deposition section 15 shown in FIG. 10 is larger than that of opening 13B of shielding plate 13 in secondary vapor-deposition section 16, and the number of evaporation ports 14A in primary vapor-deposition section 15 is larger than that of evaporation port 14B in secondary vapor-deposition section 16. Therefore, thickness t103 of rough surface layer 109 formed in primary vapor-deposition section 15 is larger than thickness t209 of rough surface layer 209 formed in secondary vapor-deposition section 16.

As described above, in the manufacturing method with the manufacturing apparatus of the embodiment, rough surface layer 109 with a larger thickness is first formed, and after that, rough surface layer 209 with a smaller thickness than rough surface layer 109 is formed. Rough surface layers 109 and 209 are subjected to radiation heat in vapor-deposition sections 15 and 16 during forming rough surface layers 109 and 209. Since the period of time for substrate 309 to pass through secondary vapor-deposition section 16 is shorter than that to pass through primary vapor-deposition section 15, the amount of radiation heat which substrate 309 receives in secondary vapor-deposition section 16 is smaller than that in primary vapor-deposition section 15. Previously-formed thicker rough surface layer 109 does not suffer damage caused by radiation heat that is generated during forming of thinner rough surface layer 209, which in turn can reduce a decrease in capacitance attributed to the increase in diameter of fine particles thereof. Thus, a stable formation of rough surface layers 109 and 209 is possible.

Figure 13:
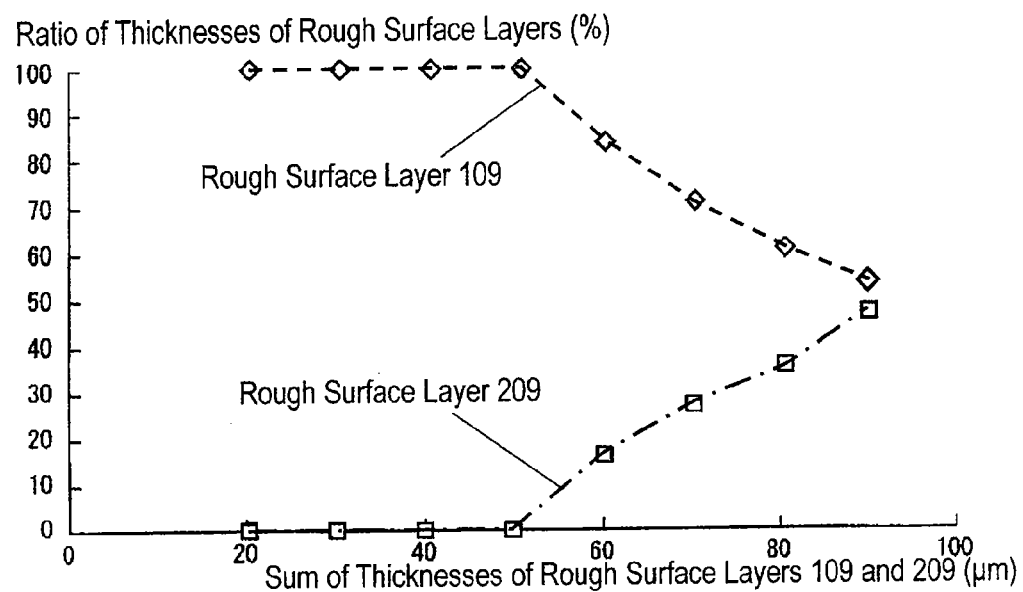
FIG. 13 illustrates ratios of thickness of the rough surface layers that are each formed on the both sides of the electrode foil of the embodiment.

FIG. 13 shows preferable ratios of thickness t109 of rough surface layer 109 and thickness t209 of rough surface layer 209 each to the sum of thicknesses t109 and t209 of rough surface layers 109 and 209 of electrode foil 9 of the embodiment.

In FIG. 13, the abscissa axis indicates the sum of thicknesses of rough surface layers 109 and 209, and the ordinate axis indicates the ratios of thickness t109 of rough surface layer 109 and thickness t209 of rough surface layer 209 each to the sum (t109+t209) of the thicknesses thereof.

As shown in FIG. 13, thickness t209 of rough surface layer 209 is preferably within a range from zero to ⅔ times thickness t109 of rough surface layer 109. In addition, thickness t109 of rough surface layer 109 is preferably 50 μm or less.

In the embodiment, rough surface layer 109 is thicker than rough surface layer 209, and the difference between thicknesses t109 and t209 of rough surface layers 109 and 209 is set to be 10% or more of thickness t109 of rough surface layer 109. In FIG. 13, the difference between thicknesses t109 and t209 of rough surface layers 109 and 209 is set to be 10% or more of thickness t109 of rough surface layer 109, and the ratio of thickness t209 of rough surface layer 209 to the sum of thicknesses t109 and t209 of rough surface layers 109 and 209 ranges from zero to $^{47}/_{100}$.

Note that, as shown in FIG. 13, thickness t209 of rough surface layer 209 is preferably 50 μm or less. As described above, in light of damage caused by radiation heat, rough surface layer 109 is preferably formed on only one of surfaces 309A and 309B of substrate 309. However, if mass-productivity, equipment issues, or ease of impregnation with forming and polymerizing solutions is taken into consideration, each of the thicknesses of rough surface layers 109 and 209 on each surfaces is maximum about 50 μm.

Accordingly, when rough surface layer 109 (209) of a thickness of 20 μm or more is formed, rough surface layers 109 and 209 are formed preferably on surfaces 309A and 309B of substrate 309, respectively, such that the difference between thicknesses t109 and t209 of rough surface layers 109 and 209 is 10% or more of thickness t109, and thickness t109 of rough surface layer 109 is the largest possible within the range not exceeding 50 μm. Note that, in the embodiment, the sum of thicknesses t109 and t209 of rough surface layers 109 and 209 is preferably 95 μm (=50 μm+50 μm×(100%−10%)).

Note that, in manufacturing apparatus 2001, aluminum is deposited onto surfaces 309A and 309B of substrate 309 to form rough surface layers 109 and 209 in primary vapor-deposition section 15 and secondary vapor-deposition section 16, respectively.

Figure 14:
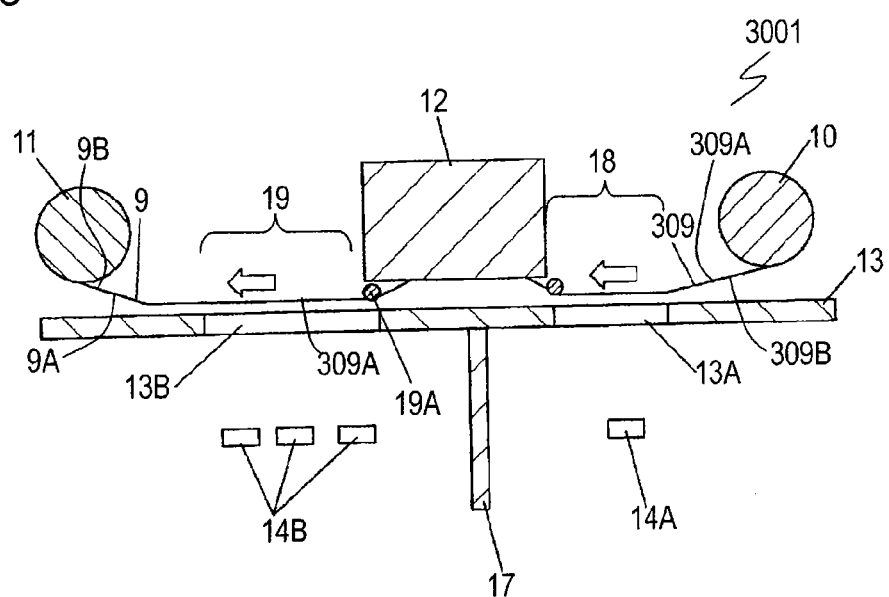
FIG. 14 is a conceptual diagram of another manufacturing apparatus for manufacturing the electrode foil for capacitor of the embodiment.
Figure 15:
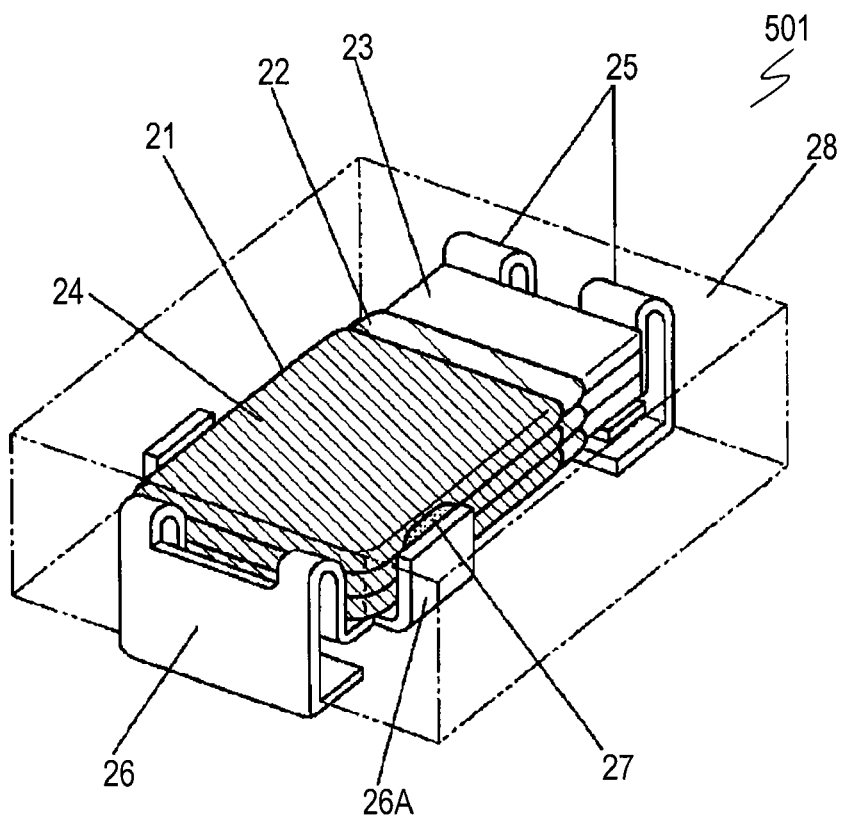
FIG. 15 is a perspective view of a conventional solid electrolytic capacitor.
Figure 16:
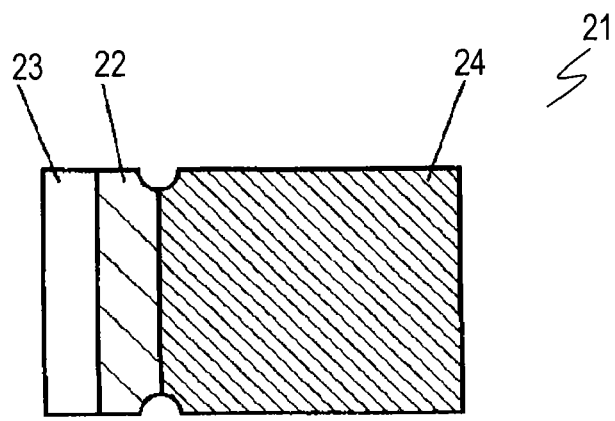
FIG. 16 is a plan view of a capacitor element of the conventional solid electrolytic capacitor.

FIG. 14 is a conceptual diagram of another manufacturing apparatus 3001 for manufacturing the electrode foil for capacitor of the embodiment. In FIG. 14, portions identical to those of manufacturing apparatus 2001 shown in FIG. 10 are denoted by the same numerals. Manufacturing apparatus 2001 is provided with primary vapor-deposition section 18 and secondary vapor-deposition section 19 instead of primary vapor-deposition section 15 and secondary vapor-deposition section 16 of manufacturing apparatus 2001 shown in FIG. 10.

Primary vapor-deposition section 18 is constructed of opening 13A disposed in shielding plate 13 and at least one evaporation port 14A. Secondary vapor-deposition section 19 is constructed of opening 13B disposed in shielding plate 13 and a plurality of evaporation ports 14B. The area of opening 13A of shielding plate 13 in primary vapor-deposition section 18 is smaller than that of opening 13B of shielding plate 13 in secondary vapor-deposition section 19. In addition, the number of the at least one evaporation port 14 in primary vapor-deposition section 18 is less than that of the plurality of evaporation ports 14 in secondary vapor-deposition section 19.

With manufacturing apparatus 3001, rough surface layer 209 is formed on surface 309B of substrate 309 in primary vapor-deposition section 18, and after that, rough surface layer 109 thicker than rough surface layer 209 is formed in secondary vapor-deposition section 19.

In secondary vapor-deposition section 19, substrate 309 is transferred with transferring member 19A, such as a roller, of high thermal conductivity which abuts substrate 309. Even if radiation heat generated during the forming of thicker rough surface layer 109 is added to previously-formed thinner rough surface layer 209, the radiation heat can be quickly conducted to transferring member 19A because of the small thickness of rough surface layer 209. This reduces damage to rough surface layer 209. Moreover, since rough surface layer 109 thicker than rough surface layer 209 more largely contributes to the capacitance of electrode foil 9 than rough surface layer 209, the influence of rough surface layer 209 on the capacitance is small even if rough surface layer 209 suffers such damage. Accordingly, manufacturing apparatus 3001 can provide a stable formation of predetermined rough surface layers 109 and 209 on surfaces 309A and 309B of substrate 309, respectively.

Note that, with manufacturing apparatus 3001, in secondary vapor-deposition section 19 and primary vapor-deposition section 18, aluminum is deposited onto surfaces 309A and 309B of substrate 309 to form rough surface layers 109 and 209, respectively. In the case where the ratio of thickness t209 of rough surface layer 209 to thickness t109 of rough surface layer 109 is set to be zero, i.e., rough surface layer 209 is not formed, aluminum is not deposited onto surface 309B of substrate 309 in primary vapor-deposition section 18.

Note that, with manufacturing apparatus 2001, in the case where rough surface layer 209 is not formed, a rough surface layer is formed only in primary vapor-deposition section 15 out of primary vapor deposition section 15 and secondary vapor-deposition section 16. In this manner, with manufacturing apparatus 3001, in the case where rough surface layer 209 is not formed, a rough surface layer is formed only in secondary vapor-deposition section 19 out of primary vapor-deposition section 18 and secondary vapor-deposition section 19.

Note that, in the embodiment, terms, such as "upper rough surface layer", "lower rough surface layer", "upper surface", "lower surface", "upward", and "below", indicating directions indicate relative directions depending only on relative positions of structural components, such as capacitor element 1, of solid electrolytic capacitor 1001, but do not indicate absolute directions, such as a vertical direction.

INDUSTRIAL APPLICABILITY

An electrode foil in accordance with the present invention includes rough surface layers stably manufactured by vapor deposition, and is useful for solid electrolytic capacitors having high capacitance.

DESCRIPTION OF REFERENCE MARKS 9 electrode foil for capacitor
101 dielectric oxide film (first dielectric oxide film)
102 solid electrolyte layer (first solid electrolyte layer)
107 cathode layer (first cathode layer)
109 rough surface layer (first rough surface layer)
201 dielectric oxide film (second dielectric oxide film)
202 solid electrolyte layer (second solid electrolyte layer)
207 cathode layer (second cathode layer)
209 rough surface layer (second rough surface layer)
309 substrate
309A upper surface (first surface)
309B lower surface (second surface)
409 tree structure
409A fine particle
409B twig

The invention claimed is:

1. An electrode foil for a capacitor, comprising:
a substrate made of a valve metal foil, the substrate having a first surface and a second surface opposite to the first surface of the substrate;
a first rough surface layer made of a valve metal formed on the first surface of the substrate by vapor deposition; and
a second rough surface layer made of a valve metal formed on the second surface of the substrate by vapor deposition, wherein
a mode of diameters of pores of the first rough surface layer and the second rough surface layer ranges from 0.02 μm to 0.10 μm, and
a thickness of the first rough surface layer is larger than a thickness of the second rough surface layer.

2. The electrode foil according to claim 1, wherein a difference between the thickness of the first rough surface layer and the thickness of the second rough surface layer is 10 percent or more of the thickness of the first rough surface layer.

3. A solid electrolytic capacitor comprising:
the electrode foil for a capacitor according to claim 2;
a first dielectric oxide film disposed on the first rough surface layer of the electrode foil for capacitor;
a first solid electrolyte layer made of a conductive polymer disposed on the first dielectric oxide film;
a first cathode layer disposed on the first solid electrolyte layer;
a second dielectric oxide film disposed on the second rough surface layer of the electrode foil for capacitor;
a second solid electrolyte layer made of a conductive polymer disposed on the second dielectric oxide film; and
a second cathode layer disposed on the second solid electrolyte layer.

4. The electrode foil according to claim 1, wherein a sum of the thickness of the first rough surface layer and the thickness of the second rough surface layer is 20 μm or more.

5. A solid electrolytic capacitor comprising:
the electrode foil for a capacitor according to claim 4;
a first dielectric oxide film disposed on the first rough surface layer of the electrode foil for capacitor;
a first solid electrolyte layer made of a conductive polymer disposed on the first dielectric oxide film;
a first cathode layer disposed on the first solid electrolyte layer;
a second dielectric oxide film disposed on the second rough surface layer of the electrode foil for capacitor;
a second solid electrolyte layer made of a conductive polymer disposed on the second dielectric oxide film; and
a second cathode layer disposed on the second solid electrolyte layer.

6. The electrode foil according to claim 1, wherein
each of the first rough surface layer and the second rough surface layer includes a plurality of tree structures, each of the tree structures including a plurality of fine particles made of a valve metal linked together, and
each of the plurality of tree structures extends from the first surface of the substrate and branches into a plurality of twigs.

7. A solid electrolytic capacitor comprising:
the electrode foil for a capacitor according to claim 6;
a first dielectric oxide film disposed on the first rough surface layer of the electrode foil for capacitor;
a first solid electrolyte layer made of a conductive polymer disposed on the first dielectric oxide film;
a first cathode layer disposed on the first solid electrolyte layer;
a second dielectric oxide film disposed on the second rough surface layer of the electrode foil for capacitor;
a second solid electrolyte layer made of a conductive polymer disposed on the second dielectric oxide film; and
a second cathode layer disposed on the second solid electrolyte layer.

8. A solid electrolytic capacitor comprising:
the electrode foil for a capacitor according to claim 1;
a first dielectric oxide film disposed on the first rough surface layer of the electrode foil for capacitor;
a first solid electrolyte layer made of a conductive polymer disposed on the first dielectric oxide film;
a first cathode layer disposed on the first solid electrolyte layer;

a second dielectric oxide film disposed on the second rough surface layer of the electrode foil for capacitor;

a second solid electrolyte layer made of a conductive polymer disposed on the second dielectric oxide film; and a second cathode layer disposed on the second solid electrolyte layer.

9. A method for manufacturing an electrode foil for a capacitor, comprising:

forming a first rough surface layer on a first surface of a substrate made of a valve metal; and forming a second rough surface layer on a second surface opposite to the first surface of the substrate, the second rough surface layer being thinner than the first rough surface layer, wherein the forming of the first rough surface layer is performed after the forming of the second rough surface layer, wherein:

said forming of the first rough surface layer comprises forming the first rough surface layer on the first surface of the substrate by vapor deposition, said forming of the second rough surface layer comprises forming the second rough surface layer on the second surface of the substrate by vapor deposition, and a mode of diameters of pores of the first rough surface layer and the second rough surface layer ranges from $0.02$ μm to $0.10$ μm.

10. A method for manufacturing an electrode foil for a capacitor, comprising:

forming a first rough surface layer on a first surface of a substrate made of a valve metal; and forming a second rough surface layer on a second surface opposite to the first surface of the substrate, the second rough surface layer being thinner than the first rough surface layer, wherein the forming of the first rough surface layer is performed prior to the forming of the second rough surface layer, wherein:

said forming of the first rough surface layer comprises forming the first rough surface layer on the first surface of the substrate by vapor deposition, said forming of the second rough surface layer comprises forming the second rough surface layer on the second surface of the substrate by vapor deposition, and a mode of diameters of pores of the first rough surface layer and the second rough surface layer ranges from $0.02$ μm to $0.10$ μm.

* * * * *